United States Patent
Miller et al.

[15] 3,686,926
[45] Aug. 29, 1972

[54] CHIP DETECTING AND MONITORING DEVICE

[72] Inventors: Charles C. Miller, Springfield; William E. Rumberger, Newtown Square, both of Pa.

[73] Assignee: The Boeing Company, Seattle, Wash.

[22] Filed: April 1, 1970

[21] Appl. No.: 24,575

[52] U.S. Cl. ................. 73/61 R, 139/426 R, 140/29, 210/85, 245/8, 324/62 R
[51] Int. Cl. ..................... G01n 15/06, G01n 27/08
[58] Field of Search...... 73/61 R, 64; 324/61 R, 62 R, 324/65 R; 340/239 F; 210/85, 90

[56] References Cited

UNITED STATES PATENTS

| | | | |
|---|---|---|---|
| 3,373,352 | 3/1968 | Huigens | 73/61 X |
| 3,343,676 | 9/1967 | Tyrrell | 210/85 X |
| 3,457,504 | 7/1969 | Arthur et al. | 73/61 X |

FOREIGN PATENTS OR APPLICATIONS

| | | | |
|---|---|---|---|
| 727,808 | 2/1966 | Canada | 210/85 |

Primary Examiner—Louis R. Prince
Assistant Examiner—Joseph W. Roskos
Attorney—Albert W. Hilburger and Joseph M. Corr

[57] ABSTRACT

A device for detecting conductive and non-conductive material present in fluid systems and lines, such as hydraulic, lubricating or cooling systems. The basic device is a woven mesh screen, which is cylindrical, flat or other shape, and comprises conductors of alternate polarity and non-conductors. The conductors may serve as the fill yarn while the non-conductors serve as the warp, or vice versa. Preferably, the selected weave exposes the conductors on one side, i.e., facing into the flow of fluid, with the non-conductors on the downstream side. A chip is detected when it contacts a pair of conductors of opposite polarity, thereby completing an electrical circuit and energizing a signal. Provision is made for incorporating a pressure sensitive device with the screen wherein rate of buildup of both conductive and non-conductive debris on the screen will be indicated by the change in pressure differential across the screen. The device, therefore, is readily incorporated into circulating fluid systems of all types. An embodiment of the invention permits the device to perform the functions of both a filter and a detector wherein debris below a certain size is not electrically detected, but is filtered out of the system.

18 Claims, 8 Drawing Figures

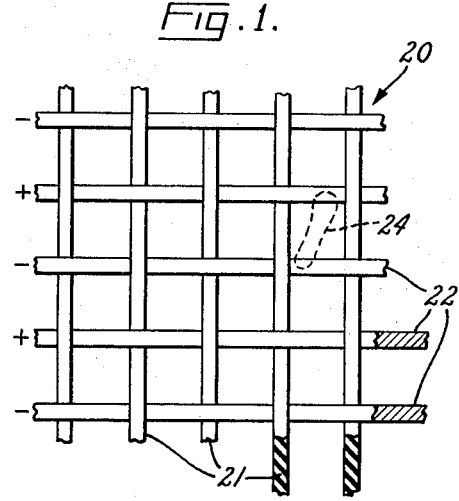
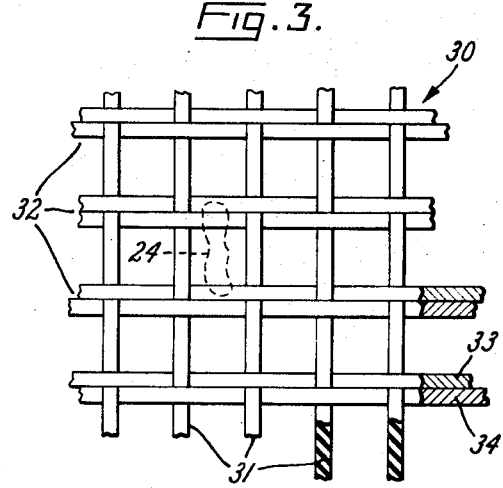
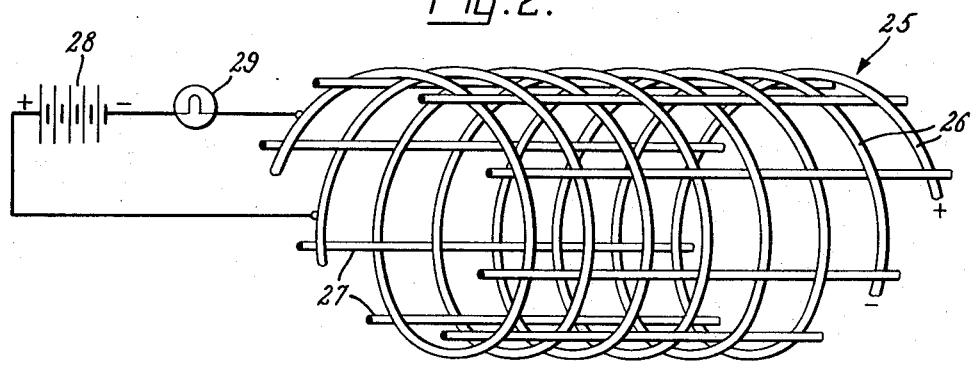
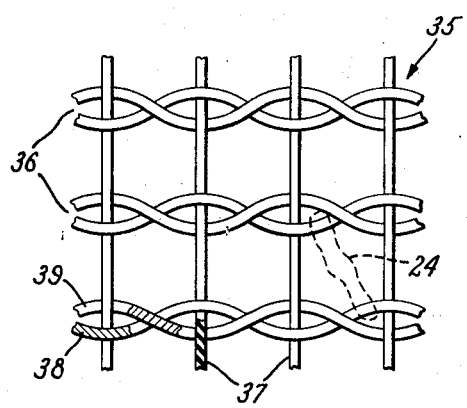
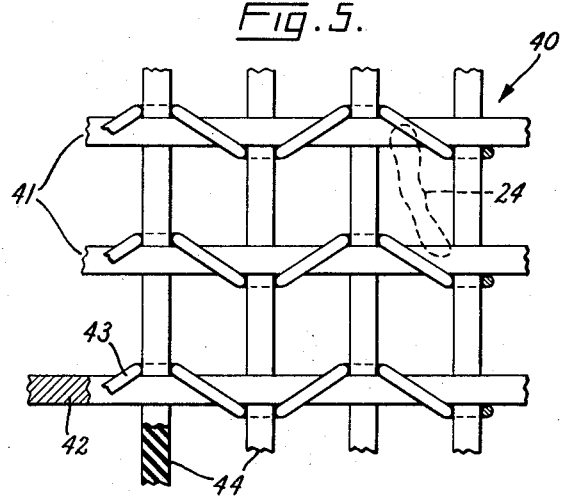
INVENTORS:
CHARLES C. MILLER,
WILLIAM E. RUMBERGER
BY Joseph M. Corr
ATTORNEY INVENTORS:
CHARLES C. MILLER,
WILLIAM E. RUMBERGER,
BY Joseph M. Corr
ATTORNEY

CHIP DETECTING AND MONITORING DEVICE

BACKGROUND OF THE INVENTION

This invention relates to a device for detecting debris in a fluid. In particular, the invention relates to a device for detecting conductive chips flowing in the oil system of various types of machinery. More particularly, the invention relates to a device which detects individual chips of metal flowing in the oil lines of various machinery, such as a transmission and which serves as a safety device by indicating the presence of the chips and preventing them from damaging the transmission. Specifically, the device acts as a condition monitor wherein it serves as an indication of the extent of structural deterioration of a machine, such as a transmission There have been various attempts in the past to detect debris or particles flowing in the lubricating or cooling lines of machinery. Such devices serve as safety devices wherein, for example, if a transmission is rapidly wearing out, the device will give a warning thereof and the transmission can be replaced before it fails or before it suffers irreparable damage.

Such prior art devices utilize the well-known concept of placing two conductors of opposite polarity in the fluid medium, and work on the principle that when a conductive particle contacts both conductors a circuit will be closed which will energize a warning mechanism to indicate the presence of the conductive chip. A variety of ways utilizing this concept have been attempted and include mounting interposed, conductive grids on a non-conductive circuit board wherein the board has holes therein to permit flow of the oil therethrough. In addition, other attempts have included placing a pair of terminals at the point where the particles will settle out while other methods involve using a simple grid of wires positioned in the flow line, or winding a pair of wires as helices on a spool. Each of the aforementioned devices work on the principle that whenever a conductive particle bridges the gap between conductors of opposite polarity a signal will be given upon closing of the circuit.

Another device using the basic principle outlined above, but having received somewhat more commercial acceptance, involves a metal screen surrounding a magnet, which may be a plug or a disc, wherein ferrous particles flowing in the oil lines are attracted to the magnet and eventually accumulate there. The magnet and the screen are of opposite polarity so that when the collection of particles on the magnet reach to the extent that they bridge the gap between the screen and magnet, the circuit is closed and the warning is given of the presence of the particles. This device, however, has a disadvantage in that if the gap between screen and magnet is too small, then a pre-mature warning would be given, since a very few particles could rapidly build up and bridge the gap. Therefore, this device would be too sensitive to the presence of a minor amount of the debris. However, if the gap is made too large, then the warning is inadequate since too large an accumulation of debris is necessary to bridge the gap. In this instance, therefore, the warning would occur after a large amount of debris has accumulated and, therefore, the machine can very easily be excessively damaged or destroyed before replacement. Also, a main disadvantage of this device involves the fact that debris which is magnetic will be detected initially while an excessive amount of other conductive debris must accumulate before being detected since it will not be attracted to the magnet.

A modification of this latter device involves using a magnetic plug without a screen. When a sufficient number of ferrous particles accumulate on the magnet to complete a circuit a warning is given. This device has the obvious disadvantages of not detecting non-ferrous chips and requiring an accumulation of debris so that it cannot continually monitor the presence of debris.

Another detecting device involves two metal screens of opposite polarity wherein one screen is within another and concentric therewith. The outer screen is coarser than the inner, having larger gaps between the wires of the screen than does the inner screen. This device suffers from the disadvantage that debris too large to pass through the outer screen will not be detected since it will not bridge the gap between inner and outer screens and debris too small to pass through the smaller screen will have to accumulate to a degree that it closes the gap between inner and outer screen. However, since the oil flow forces the debris against the inner screen and away from the outer screen, the accumulation of debris is somewhat inhibited so that accurate detection of debris is impaired. No signal is received until the debris accumulates to bridge the gap and, again, the signal may be too late since the machinery may have been injured beyond repair as a result of this insensitivity to debris including the large, undetected chips.

In summary, therefore, the prior art devices have several disadvantages and, generally, are not suitable as detecting and monitoring devices for indicating the presence of debris in the oil systems of various machinery. Some of the disadvantages include the fact that the devices are inconsistent in that by their construction they are selective in the type or size of chips detected. Thus, for example, some detectors sense only magnetic debris or accumulations of small chips so that individual chips are not detected. Nor do they continually monitor the debris so that it cannot be determined if a signal supplied by the detector corresponds to a single large particle or to a relatively large accumulation of smaller particles which have bridged the gap between conductors. In addition, no means are provided in the devices to monitor the rate of buildup of particles.

SUMMARY OF THE INVENTION

An object of this invention, therefore, is to provide a device capable of detecting individual particles of conductive debris flowing in a fluid system. In particular, it is an object of the invention to have a device capable of detecting singe conductive particles of debris of a very large range of sizes flowing in the oil or hydraulic system of machinery. It is the purpose of the invention, therefore, to provide a debris detecting device which upon contact with a conductive particle in a fluid system of a machine will energize a signal means which will indicate the presence in the system of such conductive particles.

It is another object of the invention to provide a detecting device which is capable of not only indicating the presence of individual debris particles, but in addition, has means to indicate a buildup of these particles on the device. It is possible that after individual chips accumulate over a period of time, incoming chips will not be electrically detected since the conductors have become masked by the accumulation. However, the presence of the additional chips will be observed by an increase in pressure differential across the detector or by a decrease in the electrical resistance of the circuit. A further object of the invention, therefore, is to provide a pressure sensitive means in association with the detecting device wherein the pressure differential across the detecting device is indicated and, therefore, a clear indication of buildup of debris on the device is indicated. The rate of buildup of debris can be measured by reading the change in pressure differential over a period of time. A further object of the invention is to provide a means such as an ohmmeter for measuring the change of resistance in the electrical circuit associated with the detecting device wherein the change of resistance indicates a rate of buildup of conductive debris on the detecting device.

It is an additional object of the invention to provide a chip detecting device which is sturdy, relatively inexpensive, and adapted to be incorporated into commercial machinery of all types. In particular, it is an object of the invention to have a detecting device which is made according to textile weaving techniques wherein the device is a woven screen-like mechanism. A further object of the invention, therefore, is to have a detecting device which is made of a plurality of electrical conductors together with non-conductors wherein the conductors and non-conductors are intermeshed to form a woven pattern wherein the spacing between electrical conductors is maintained relatively constant throughout the screen-like detecting device. Thus, the object is achieved of providing a device wherein conductors of opposite polarity are held in place and prevented from coming into contact and inadvertently short circuiting the device.

A further object of the invention is to provide a woven chip detecting device wherein the conductors of the device are arranged to be presented directly against the fluid flow and, thereby, the greatest amount of conductive surface is exposed to the fluid and the conductive chips contained therein. In addition, by weaving the detector in a manner to assure uniform spacing of conductors throughout the pattern, accuracy in detecting chips of debris is provided.

Therefore, a general object of the invention is to overcome the various disadvantages of the prior devices as outlined above, while other objects and advantages of the invention will become apparent from the discussion which follows.

BRIEF DESCRIPTION OF THE DRAWINGS

FIG. 1 is a drawing of a section of a detecting device made as a plain weave.

FIG. 2 is a cylindrically shaped detecting device made according to the plain weaving technique of FIG. 1.

FIG. 3 illustrates a modified plain weave which can be used in making the detecting device.

FIG. 4 illustrates a leno weave for making a detecting device of this invention.

FIG. 5 is a drawing of a modified leno weave for making the detecting device.

DESCRIPTION OF THE PREFERRED EMBODIMENTS

Figure 6:
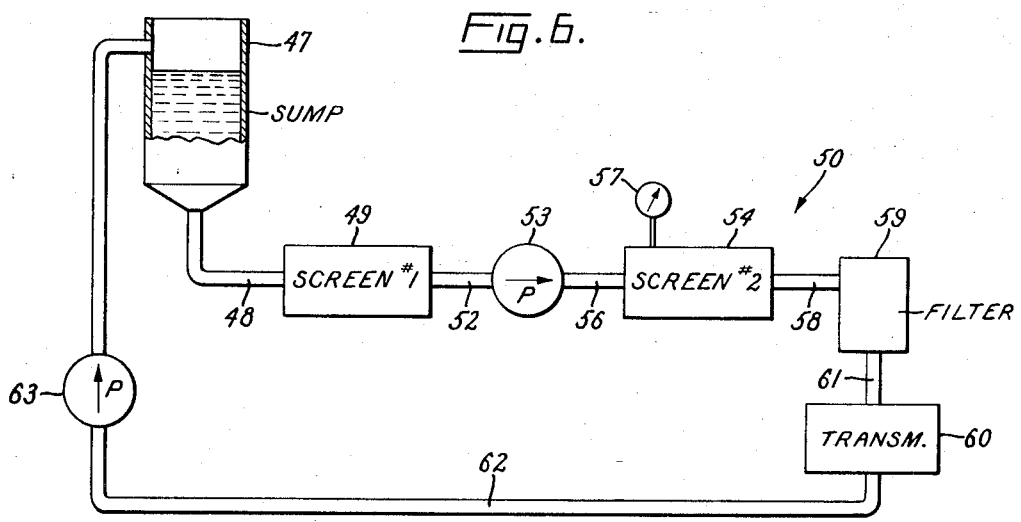
FIG. 6 is a block diagram showing the locations of detecting screens in the oil lines in a transmission system.

In the following discussion, various preferred embodiments of the invention will be discussed and the invention will be described as used in the oil system of a transmission. However, the following discussion is in no way limitative of the scope of the invention since it is clearly obvious to anyone skilled in the art that the application of this device is extremely broad and can be used in any instance where it is desired to detect the presence of debris, conductive and non-conductive, in a fluid. Therefore, an application readily apparent is to use the device in any hydraulic, lubricating or cooling system of various types of machinery, in order to prevent damage to the machinery by metallic chips in the fluid system. In addition, the detector serves as a safety device and condition monitor in that it can indicate the presence of chips, as well as indicate an accumulation thereof, so that a measurement of the amount of structural deterioration of the particular machinery can be obtained. In addition, although particular types of weaving techniques will be illustrated these are meant as illustrative only and indicative of the types of detecting devices which can be readily made and which have been shown to operate in the desired manner. For purposes of clarity and because of the use of textile manufacturing techniques, various textile terminologies will be used throughout the discussion, and such terminologies retain the broad meanings commonly attributed thereto by the textile industry.

Turning now to FIG. 1, a portion 20 of a flat detecting screen is shown to illustrate what is commonly known as a "plain weave." In this particular drawing, the non-conductors are the warp while the conductors appear as the fill. Thus, the non-conductors, which preferably are fiberglass or any suitable synthetic, plastic or other non-conductive material which can be woven, are shown as 21 and run longitudinally. The non-conductors preferably are impregnated with epoxy. Filled in laterally across the non-conductors and substantially spaced uniformly along the length of the warp are the conductors 22. The conductors can be made of any suitable material which is non-corrosive in the medium in which the device is used, while for most applications stainless steel wire is preferred.

As is apparent in FIG. 1, the weave illustrated therein is a basic plain weave. In this respect therefore, the reader's attention is directed to the uppermost conductor 22. Following this conductor from left to right, it is first drawn over the first non-conductor 21, then passes under the next non-conductor, then over the third non-conductor and so on in alternating fashion. The second uppermost conductor 22 viewed from left to right, passes under the first non-conductor 21, then over the second non-conductor then under the third non-conductor and so forth alternatingly. The succeeding conductors 22 repeat the weaving pattern of the first two to form a plain weave pattern which interlocks the warp and fill so that the warp, i.e., the conductors, is substantially uniformly spaced throughout the pattern. In practice, when a fully assembled detecting screen is to be used, the conductors 22 are alternately connected to electrical terminals of opposite polarity so that adjacent conductors are of opposite polarity as shown. If a conductive chip or particle, shown in phantom as 24, bridges the gap between adjacent conductors, an electrical circuit will be completed. The electrical circuit is not shown in the figure, but as can easily be envisioned, it includes the electrical power source and a warning mechanism, such as a lamp, which would light up upon completion of the circuit by the chip 24.

Although in FIG. 1, the conductors have been shown as the fill while the non-conductors as the warp, it is contemplated that these members could be woven so that the conductors are the warp and the non-conductors as the fill. Such an arrangement is really a matter of choice and is not limitative of the invention. In addition, as noted previously, the term "plain weave" is a generic term and may encompass other, similar weaves such as, by example, a basket weave which has two or more warp ends weaving as one end over and under two or more filling picks weaving as one pick.

In FIG. 2, a cylindrical detector 25 is shown wherein two continuous conductors are formed into spirals and woven with a plurality of non-conductors in plain weave manner. This particular detector offers structural strength and indicates the versatility of using weaving techniques to provide detectors of various dimensional shapes.

The conductors are designated 26 and are shown as continuous spirals inside the plurality of parallel non-conductors 27. The pair of conductors are woven with the non-conductors in plain weave wherein each conductor weaves as a filling pick over and under the non-conductive warp in the basic manner described in FIG. 1. Schematically illustrated is a source of electricity such as a battery 28 with a light 29 which serves as a warning signal. The conductors 26 are connected to the battery terminals in series with the light 29. Similarly as described in FIG. 1 any conductive chip which bridges a gap between the conductors will complete the circuit and cause the light to illuminate and signal the presence of the chip.

The cylindrical detector has been described as a plain weave such as FIG. 1, although it can readily be made according to various weaving techniques. A particular detector has been made using the modified plain weave of FIG. 3 and involved arranging the non-conductors around a mandrel which was rotated by a motor. The conductors were woven with the non-conductors to result in the pattern depicted in FIG. 3. The resulting detector screen was a strong construction which had a large amount of conductor exposed to the fluid flow and provided a high degree of reliability in detecting conductive particles in the fluid.

FIG. 3 is a drawing of a modified plain weave 30, wherein the modification basically consists in having two conductors in place of every one conductor used in the plain weave of FIG. 1. The modified weave was developed in order to improve upon the basic weave in several respects. Specifically, the modified weave provides improved interlocking of conductors and non-conductors exposes more conductor surface area to the fluid flow than does the plain weave; and provides a flatter screen surface. The latter improvement is desired since the plain weave tends to cause the non-conductors to rise above the conductors so that if one were to look on edge at a plain weave screen, he would see the non-conductors protruding as bumps or beads facing into the fluid flow. Consequently, the amount of conductor area exposed to the fluid flow is effectively lessened by the non-conductors protruding out into the incoming fluid flow.

Therefore in FIG. 3, a series of non-conductors 31 are shown again as the warp and may be made of the same materials previously discussed. Each conductor 32 actually consists of two conductors which are woven separately in plain weave. Looking at the two conductor members 33 and 34 which comprise the bottom conductor 32, the modified plain weave will be explained. Following the conductor members from left to right, it can be observed that member 33 weaves over and under the non-conductors beginning with the first non-conductor 31 on the left, while member 34 weaves under and over the successive non-conductors. Therefore, members 33 and 34 alternately are over and under the non-conductors whereby the members at no time are both over or both under the same non-conductors. The conductor members of the other conductors 32 repeat the weaving just described so that with this particular weaving, the improvements over the basic plain weave are achieved. Again, if desired, the conductors could be the warp and the non-conductors the fill. A chip 24 is again shown bridging the space between two conductors 32.

FIG. 4 illustrates a leno weave 35 which has been found to be quite satisfactory in the practice of this invention. This weave, like that of FIG. 3, involves each conductor being made up of two conductor members separately woven over the non-conductors. The leno weave is an additional improvement over the modified plain weave since better interlocking is achieved to provide a tighter mesh and, therefore, a more stable electrical circuit. An immediate consequence of better interlocking is an improved control over mesh size and maintenance of uniform mesh throughout the pattern.

In the present state of the art, the double strand or "leno" can only be in the warp direction. Therefore, in FIG. 4 the conductors 36 are the warp while the non-conductors 37 serve as the fill.

Viewing FIG. 4 therefore, the manner in which members 38 and 39 of the bottom conductor 36 are woven will be described and the description equally applies to the other conductors. It can be stated initially, however, that a characteristic of the leno weave is that one warp always passes under the fill and over the other warp while the other always passes over the fill and under the first warp. This can be seen simply by following the weave of conductive members 38 and 39 beginning with the first non-conductor on the left and reading left to right.

Therefore, member 38 passes over the first non-conductor, crosses under member 39, passes over the next non-conductor, crosses under member 39 and so forth. Member 39, however, passes under the first non-conductor, crosses over member 38, passes under the second nonconductor, crosses over member 38, and so on. Therefore in a leno weave, the conductive members 38 and 39 of conductors 36 do not twist on each other. The portion 35 of the screen shown in FIG. 4 is flat, but a cylindrical or other shaped leno weave detector can easily be made. A chip 24 is shown bridging two conductors.

FIG. 5 is a drawing of a modified leno weave which is preferred in making a detector of this invention. In this modified leno weave 40, each warp conductor 41 comprises a pair of conductor elements 42 and 43 which preferably are stainless steel wires. The fill non-conductors appear as 44 and again preferably are made of epoxy impregnated fiberglass. Comparing FIGS. 4 and 5, the modification introduced in FIG. 5 can be easily perceived. In particular, viewing the bottom conductor 41, the conductor member 42 is showing placed flat on top of each non-conductor 44 and at no point does it pass under any non-conductor. Beginning with the first non-conductor on the left and going toward the right, the conductor member 43 is shown weaving in the same manner as conductor 39 does in FIG. 4.

Therefore, member 43 passes under the first nonconductor, crosses over member 42, passes under the next non-conductor, crosses over member 42, and so forth. As shown, this weaving technique is repeated for each conductor 41 in order to make an entire detector screen. Locking and intermeshing of conductors and non-conductors is facilitated by the manner in which 43 tightly wraps over 42 and under 44. This modified leno weave is an improvement over FIG. 4 in that it provides a tighter mesh so that a screen of finer mesh size can be made. In addition, since conductor member 42 never passes under the non-conductors, a larger amount of conductor surface area is provided. This larger conductor area is generally exposed on the fluid flow side of the screen while the non-conductors are generally on the side downstream of the flow.

Conductor member 43 is seen to be smaller than 42 and in practice, member 43 has been made of 0.008 inch annealed wire while 42 was 0.012 inch. In another screen 43 was 0.012 inch while 42 was 0.032inch. The member 43 was smaller to facilitate weaving and in point of fact, the wire gauges could be equal. Also, the gauge wire used in the detectors of the other Figures was of similar size, it being understood that the selection of wire gauge is primarily determined by the size of the screen desired, its structural strength, and the weaving technique used. A chip 24 bridges the space between two conductors.

In FIG. 1, it was mentioned that the conductors 22 could easily be connected alternately to terminals of opposite polarity to render the conductors alternately polar. Similarly, in FIGS. 3, 4, and 5, the conductors shown therein as each comprising two conductor members are, in practice, alternately connected to terminals of opposite polarity. This can be achieved in any conventional manner such as joining all conductors of positive polarity to a common conductor which is connected to a positive terminal while joining the negative polar conductors to a common conductor which is connected to a negative terminal which usually is done by connection to ground. In addition, many weaving techniques permit weaving the screen as a flat element only, so that in order to make a cylindrical type screen, the flat piece is placed on a mandrel and soldered or welded along a seam to join the piece into a cylinder. The method of so conforming a screen into a cylinder as well as the method of joining all the conductors to their respective terminals have not been shown in all the figures since the methods are obvious and not essential to an understanding of the invention.

A further point to be made is the fact that in all the screens described, it is preferred that the conductors be bonded to the non-conductors at each intersection thereof. Bonding can result from in situ curing of the epoxy impregnated in the fiberglass which aids the overall structural integrity of the screen.

FIG. 6 is a block diagram illustrating schematically the locations of a pair of detector screens in the oil lines of a transmission system 50. Although a transmission system is depicted, it is recognized that this is a specific application only and that the invention can be easily used in many lubricating, cooling, oiling or other systems where it is desired to detect the presence of debris, particularly conductive chips, in the system.

Therefore, a sump or other reservoir of oil is shown at 47 and is connected by an oil line 48 to a housing 49. As the oil passes through housing 49 it passes through a relatively coarse detecting screen. The screen is referred to as coarse since it has a relatively large mesh size and is designed primarily to stop and detect relatively large chips of debris. Its particular function in this instance is to protect the pump 53 by preventing larger chips from flowing out of housing 49 and into oil line 52 which connects the housing and pump. Normally, therefore, the coarse screen is located on the suction side of pump 53.

On the pressure side of pump 53 is a second housing 54 which is connected to the pump by oil line 56. Schematically shown connected to housing 54 is a pressure gauge 57. Preferably the gauge 57 is not the dial face type but is a pressure probe which is electrically coupled to a conventional readout display or other mechanism. Within housing 54 is a second screen which is preferably a finer mesh detecting device and, therefore, detects smaller debris particles and removes them from the fluid. Therefore, the screen in housing 54, together with the pressure gauge, provides a means for detecting the chips of debris as well as monitoring the buildup of debris as reflected in pressure changes across the screen.

Connected by line 58 to housing 54 is a filter 59 which is optional in the system, but is normally provided to aid in keeping the oil clean. The transmission 60 is next in line after the filter and is connected therewith by line 61. The oil is then returned t' the pump 47 via return line 62 and pump 63.

The system schematically illustrated in FIG. 6 is a relatively simple system showing the manner in which two detecting screens may be readily incorporated into the system to detect and remove debris from the fluid. As noted previously, the applications of this invention are numerous and broad and FIG. 6 schematically depicts in block form one such application.

Figure 7:
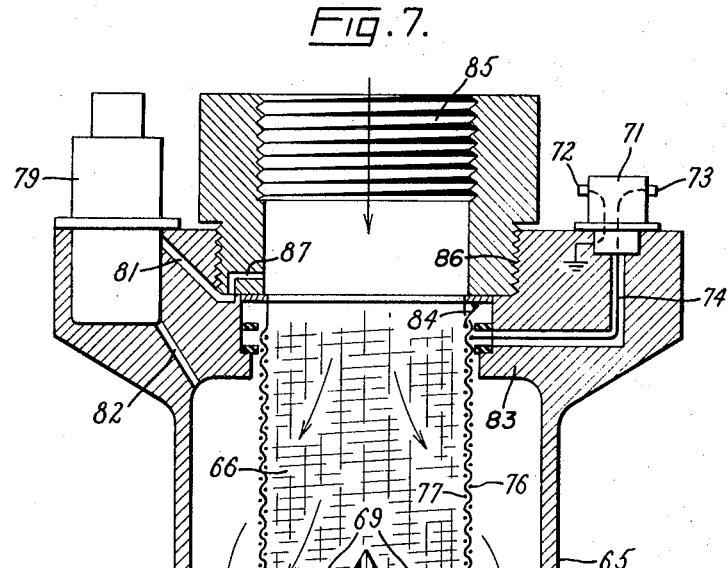
FIG. 7 is a drawing of a monitoring device which is capable of detecting individual conductive chips, as well as detecting accumulation of debris on the detecting screen.

FIG. 7 is a drawing in section of a particular combined detecting screen and pressure measuring device which may be used as item 54 in the system depicted in FIG. 6. A large number of devices for particular systems applications can readily be fabricated and of which FIG. 7 is typical.

The device comprises a metal housing 65 which is open at both ends for flow through of fluid and is threaded at each end as shown for connection to the rest of the system. The device is connected so that the direction of flow is as indicated by the arrows. A cylindrical detection screen is shown at 66 having a conical bottom 68 made of fiberglass or other suitable material. The screen is preferably made using the modified leno weave of FIG. 5, although other weaving techniques may be used. The conical shaped bottom 68 causes the flow to be diverted as shown and allows collection of debris particles in the space 69. It is conceivable that some of the debris which collects in the space 69 may not be detected electrically by the screen. However, its presence will be observed by its effect on the pressure differential across the screen.

An electrical terminal 71 has two prongs for connection to a source of potential so that one prong is positive and the other is negative or ground potential. The negative prong 72 is grounded to housing 65 while the positive prong is connected to a common conductor 76 by a lead 74. The conductor 76 is connected to alternate screen conductors to render them positive while a second common conductor 77 is grounded to the housing and connects the remaining screen conductors to ground. Therefore, the proper polarity is placed on all the screen conductors to make it sensitive to the presence of conductive chips.

A pressure differential switch 79 is connected to the upstream and downstream sides of the screen 66 by appropriate channels 81 and 82 respectively. The switch is conventional and is capable of measuring the pressure differential across the screen and consequently indicates the rate of buildup of debris on the screen which clogs the screen and thus increases the pressure change across the screen. Such switches are commercially available in various sizes so that the proper one may be obtained to match the size of the device and operating pressures.

If the system is a constant volume and pressure system, then a pressure switch which measures only the upstream pressure may be used to give an indication of the buildup of debris on the screen. The switch 79 shown in FIG. 7 has more general application to various systems and, therefore, was shown to define the invention more clearly. As can be seen in the Figure, the screen 66 is held in place by being pressed between a shoulder 83 of housing 65 and the bottom 84 of coupling member 85 which is threadedly engaged at 86 to housing 65. Passage 87 in member 85 connects passage 81 and pressure switch 79 to the upstream side of screen 66 which is simply the center of the cylindrical screen.

Since the switch 79 triggers when a predetermined area of screen is covered by an accumulation of debris, it can readily be seen that the conical shaped bottom 68 increases the sensitivity of the device to the initial buildup of relatively small amounts of debris. This occurs because the debris tends to collect at the base of cone 68 where the volume is smaller. Therefore, a relatively small volume f debris collected at the base of the cone will cover the area of screen necessary to trigger switch 79. As one approaches the apex of the cone, the volume of collected debris necessary to cover the predetermined screen area is increased.

Figure 8:
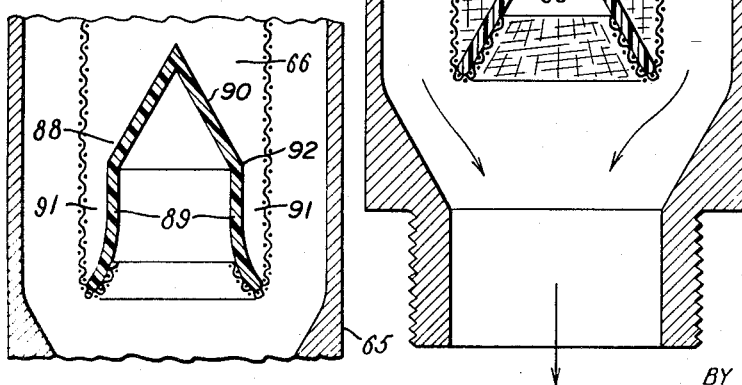
FIG. 8 shows a modified form of the bottom of the screen in FIG. 7.

Other shaped bottoms 68 are readily apparent for increasing the sensitivity of the device to the initial accumulation of debris. Once such modification appears in FIG. 8 wherein the bottom portion 88 of the screen 66 is shown wherein the bottom has vertical side walls 89 with a cone shaped top 90. A relatively confined annular space 91 between walls 89 and the screen permits an increase in sensitivity since each time the required screen area is covered by accumulated debris, the switch 79 will give a signal. Therefore, before the debris accumulates up to the level 92, several signals will have been given by the pressure switch 79, if desired.

It has been stated that the buildup of debris on the screen may be detected by means of the pressure differential switch which gives a signal when the pressure change across the screen is a particular value. The rate of buildup can be measured in various ways easily recognized by those skilled in the art. Therefore, if the pressure differential is measured across the screen at time, $T_1$ and the switch 79 is reset to trigger at a higher pressure differential, the switch will give a second signal at time $T_2$ when the accumulation of debris has built up to an amount to cause the higher pressure differantial. The time between signals, $T_2$- $T_1$, together with the increase in pressure differential, serve to indicate a rate of debris buildup. Another method would be to use a multiple contact pressure switch for switch 79 wherein a series of circuits would be closed in succession as the accumulation of debris on the screen increases. Rate of buildup would readily be measured with such a switch. The use of a linear differential transformer responsive to changes in pressure differential also could be used to monitor pressure differential continually.

An additional and important embodiment of this invention may easily be provided wherein a significantly tighter mesh may be achieved in the screen so that the screen can perform the essential functions of a filter, as well as a detector. In the embodiments shown in the various Figures and discussed above, a series of non-conductors are uniformly arranged in one direction while a series of conductors are uniformly arranged in another direction and woven with the non-conductors to form the screen. The conductors are alternately polarized whereby adjacent conductors are of opposite polarity. Therefore, any conductive debris smaller than the distance between adjacent conductors is capable of passing through the screen undetected. It is to be understood that this is not necessarily an undesirable feature of the screen as it is contemplated that the debris of such small size need not be detected since such small debris is not indicative of a significant structural deterioration of the transmission or other machinery. In fact it is generally desired that such debris below a certain size not be electrically detected. If this were not so then many unnecessary warning signals would occur so that the warning signal would lose its effect in providing the operator with a meaningful indication of the amount of structural deterioration.

However, although it is desired that particles of a certain size be permitted to go undetected it may equally be desired that such particles be removed and filtered out of the fluid system. The embodiment discussed here provides this dual detector and filter device. Referring to FIGS. 1, 2, 3, 4, and 5, this modification can readily be understood. Therefore, as an example, in FIG. 1, a separate insulating strand can be woven parallel to and between each pair of conductors, such as midway therebetween. Any particles which are larger than the distance between the insulating strand and a conductor will be prevented from passing through the screen, but will not trigger a signal. Only particles that are equal or larger in size than the distance between oppositely polar conductors will still be detected by the monitoring device. Therefore the screen will function both as a filter and as a detector. Of course, more than one strand may be interposed between the conductors, if desired.

It is readily apparent that instead of weaving a separate insulating strand between conductors a similar result can be achieved simply by not polarizing alternate conductors whereby one conductor will be of positive potential and another conductor will be of negative potential with the conductor located therebetween being neutral. Therefore, debris of a size equal to or larger than the distance between the neutral conductor and one of the polarized ones will be filtered and not detected while particles equal to or larger than the distance between polarized conductors will be detected.

Similar modifications can be made to the screens illustrated in FIGS. 2, 3, 4, and 5 to render these as dual purpose filter-detector devices. In all embodiments, of course, it is understood that as to the debris which is large enough that it bridges the gap between polarized conductors, the screen acts as a filter since such particles are unable to pass through the screen and, therefore, are filtered out of the fluid system. The present embodiment increases the filtering capacity without affecting the detector characteristics. Thus, the detection requirements of the device are maintained independent of the filtering requirements. This embodiment can readily be incorporated into FIGS. 6 and 7.

What has been described are preferred embodiments of this invention. Such embodiments are not limitative of the scope of the invention, but rather, it is emphasized that the invention has broad application and numerous embodiments and modifications which fall within the general scope and spirit of the invention's teaching of a woven chip detecting device which is highly reliable, sensitive and of high structural integrity.

What we claim is:

1. An apparatus for detecting and monitoring the presence and accumulation of electrically conductive and non-conductive debris in a fluid comprising in combination:

a woven screen having electrically non-conductive members in one direction parallel to each other, electrically conductive members in another direction parallel to each other and substantially perpendicular to said non-conductive members, said conductive members being adapted to be connected to a source of electrical potential, whereby selected conductive members have a positive polarity and selected other conductive members have a negative polarity, said conductive and non-conductive members being woven together in an interlocking manner to resist movement of said conductive members, said conductive members being exposed substantially all on one side of said screen, means operatively associated with said screen for indicating the presence of conductive debris on said screen when said conductive debris contacts conductive members of opposite polarity, and means for sensing increases in accumulation of debris on said screen.

2. The apparatus of claim wherein each of said conductive members comprises a pair of conductors interwoven with said non-conductive members so that the first of said conductors passes under a non-conductive member and diagonally crosses over said second conductor before passing under another non-conductive member.

3. The apparatus of claim 2 wherein said second conductive member is positioned on top of said non-conductive members.

4. The apparatus of claim 3 wherein said first conductor passes under each non-conductive member to provide a rigid locking of said conductive members and said non-conductive members to each other.

5. The apparatus of claim 1 wherein said means for sensing increases in accumulation of debris comprises a pressure detecting device for measuring the fluid pressure differential across said screen.

6. The apparatus of claim 1 wherein said means for sensing increases in accumulation of debris comprises a resistance measuring device operatively associated with said screen for measuring changes in electrical resistance throughout said screen.

7. The apparatus of claim 1 wherein said non-conductive members are fiberglass and said conductive members are stainless steel.

8. The apparatus of claim 7 wherein the fiberglass non-conductive members are impregnated with epoxy and said conductive members are bonded to said non-conductive members at their points of intersection by curing said epoxy in situ.

9. The apparatus of claim 1 wherein a timing mechanism is operatively associated with said means for detecting said increases in accumulation of debris whereby the rate of debris accumulation can be measured.

10. The apparatus of claim 1 wherein said apparatus is cylindrical with one end closed by a conical insulator.

11. An apparatus for detecting and monitoring the presence and accumulation of conductive and non-conductive debris in an oil circulating system comprising:

a wire cloth screen having a plurality of plastic non-conductive members arranged parallel to each other, a plurality of metallic wire conductive members arranged parallel to each other and perpendicular to said non-conductive members, said non-conductive members and said conductive members being interwoven in a wire mesh in a modified leno manner, means for connecting selected conductive members to a positive potential and for connecting selected other conductive members to a negative potential, means for indicating when conductive debris contacts conductive members of opposite polarity, and means for measuring the pressure differential across said screen to detect discrete increases in pressure across said screen and thereby detect the increase in accumulation of debris on said screen.

12. The apparatus of claim 11 wherein a timing device is used in combination therewith for measuring the rate of change in fluid pressure across said screen and thereby being a measure of the rate of accumulation of debris on said screen.

13. The apparatus of claim 11 wherein said plastic non-conductive members are fiberglass and said conductive members are stainless steel.

14. The apparatus of claim 13 wherein said fiberglass non-conductive members are impregnated with epoxy and said conductive members are bonded to said non-conductive members at the intersections thereof by in situ curing of the epoxy.

15. An apparatus for use in an oil circulating system for detecting debris therein and comprising:

a wire screen comprising a plurality of non-conductive parallel members and a plurality of parallel conductive members substantially perpendicular to said non-conductive members, means for connecting selected ones of said conductive members to a source of negative potential and for connecting selected conductive members to a positive potential source, said conductive members being interwoven with said non-conductive members in a manner to expose said conductive members substantially on one side of said screen, means for sensing the presence of conductive debris on said screen when said debris connects positive conductive members to negative conductive members, multi-step pressure sensing means for detecting discrete increases in the fluid pressure across said screen, and resistance measuring means operatively connected to said screen to monitor changes in electrical resistance thereof.

16. An apparatus for detecting and monitoring the presence and accumulation of both conductive and non-conductive debris in an oil circulating system comprising in combination:

a housing adapted to be connected in said oil circulating system, a woven wire screen comprising a plurality of plastic non-conductive members arranged parallel to each other in one direction and a plurality of metallic conductive wire members arranged parallel to each other and substantially perpendicular to said non-conductive members, said non-conductive members and said conductive wire members being woven in a modified leno weave wherein said conductive wire members each comprises two wires wherein a first wire lies on top of the non-conductive members and the other wire passes under said non-conductive members while crossing over said first wire between said non-conductive members, means for connecting said conductive wire members to an electrical potential source whereby selected conductive wire members have a positive potential and selected other conductive wire members have a negative potential, said screen being positioned within said housing to have said conductive wire members exposed to the inflowing oil, means for detecting the presence of conductive debris in said oil when said conductive debris bridges the gap between conductive wire members of opposite polarity, means for detecting increases in accumulation of both conductive and non-conductive debris on said screen, and means for indicating said increases in accumulation of debris 17. The apparatus of claim 16 wherein said means for detecting increases in accumulation of debris comprises a multi-step pressure differential measuring device whereby discrete thresholds of accumulation can be detected and said indicating means being adapted to indicate such discrete thresholds.

18. The apparatus of claim 16 wherein said means for detecting increases in accumulation of debris comprises an electrical resistance measuring device to monitor changes in electrical resistance of said screen and said indicating means is adapted to indicate discrete changes in said electrical resistance.

* * * * *